United States Patent
Mestha et al.

(10) Patent No.: US 8,294,956 B2
(45) Date of Patent: Oct. 23, 2012

(54) FINISHING CONTROL SYSTEM USING INLINE SENSING WITH CLEAR TONER

(75) Inventors: Lalit Keshav Mestha, Fairport, NY (US); Peter Stanley Fisher, Pasadena, CA (US)

(73) Assignee: Xerox Corporation, Norwalk, CT (US)

( * ) Notice: Subject to any disclaimer, the term of this patent is extended or adjusted under 35 U.S.C. 154(b) by 727 days.

(21) Appl. No.: 12/260,476

(22) Filed: Oct. 29, 2008

(65) Prior Publication Data

US 2009/0296981 A1 Dec. 3, 2009

Related U.S. Application Data

(60) Provisional application No. 61/056,606, filed on May 28, 2008.

(51) Int. Cl.
G06K 9/00 (2006.01)
G06K 15/02 (2006.01)
(52) U.S. Cl. ................ 358/3.28; 328/141; 328/100
(58) Field of Classification Search ............ None
See application file for complete search history.

(56) References Cited

U.S. PATENT DOCUMENTS

| | | | |
|---|---|---|---|
| 7,299,984 B2 | 11/2007 | Euchner et al. | |
| 7,995,227 B2* | 8/2011 | Perdu | 358/1.15 |
| 2002/0197088 A1 | 12/2002 | Thompson | |
| 2006/0285134 A1 | 12/2006 | Viturro et al. | |
| 2006/0285147 A1* | 12/2006 | Wolfman et al. | 358/1.14 |
| 2006/0290760 A1 | 12/2006 | German et al. | |
| 2007/0076273 A1 | 4/2007 | Viturro et al. | |
| 2007/0177764 A1* | 8/2007 | Harman et al. | 382/103 |
| 2008/0001392 A1* | 1/2008 | Reichelsheimer et al. | 283/81 |
| 2009/0040563 A1 | 2/2009 | Mestha et al. | |
| 2009/0296993 A1 | 12/2009 | Mestha et al. | |

* cited by examiner

*Primary Examiner* — Twyler Haskins
*Assistant Examiner* — Christopher D Wait
(74) *Attorney, Agent, or Firm* — Fay Sharpe LLP

(57) ABSTRACT

The present application discloses a system, method and device for placing substantially invisible marks comprising alphanumeric characters, symbols, or bar codes, on a page using clear ink or toner, which may then be read by a spectrophotometer. Such substantially invisible marks are not viewable to the unaided eye of a human observer, do not distract a viewer, and allow the viewer to focus their attention on the printed matter and text of interest to the viewer.

16 Claims, 6 Drawing Sheets

FINISHING CONTROL SYSTEM USING INLINE SENSING WITH CLEAR TONER

This application claims the benefit of U.S. Provisional Application No. 61/056,606, filed May 28, 2008, the disclosure of which is incorporated herein in its entirety by reference.

BACKGROUND

Visible labels can often be obtrusive and visually distracting to persons using a product. However labels are necessary to serve the important business function of conveying product related information to the product manufacturer and product seller. Such information is irrelevant and unimportant to the buyer and ultimate end user, who thus do not need to access such information. What is currently needed, but lacking in the present art is a labeling means that performs the information conveyance function for the manufacturer and seller, but is invisible to and unobtrusive to the buyer and end user.

BRIEF DESCRIPTION

The present application relates to the area of invisible sensing, which conveys information to a manufacturer or seller using labels not visible to the human eye, but detectable by an electronic device. The graphic arts industry uses control marks and symbology to convey information between parties within the printing process. Control marks are markings that convey information such as a bar code or UPC code. Symbology is the use of symbols within cultural context to convey a message such as the handicapped symbol or the traditional barber's pole. Such marks as used in the graphic arts printing industry for automated inserts are black, obtrusive and generally undesirable to the aesthetic quality of the document. Customers generally do not like the black visible marks due to the fact that they are obtrusive and divert the attention away from the contents of the document. The present application discloses a new and novel means by which the marks may be affixed to the pages for use by the printer, and yet be invisible to the unaided eye. These marks can be read through use of an inline spectrophotometer. Use of clear toner allows the ability to sense invisible control marks at the beginning and end of the document. The present application may improve the customer satisfaction and also allow the ability to control the finishing system without printing unnecessary visible marks. The graphic arts industry has a current, unmet need for unobtrusive, invisible marks which would allow the customers to view the contents of the document without the needless distraction caused by visible marks.

While paper is a common printing medium used in the present application, the present technology may also be readily used in conjunction with any medium including, but not limited to, paper products, cardboard, wood, metals, plastics, polymers, ceramics, glass, super cooled liquids, frozen liquids, and the like.

BRIEF DESCRIPTION OF THE DRAWINGS

FIG. 5 is an illustration of the many types of marks that may be placed on the page in substantially invisible ink or clear toner; and.

DETAILED DESCRIPTION

Figure 1:
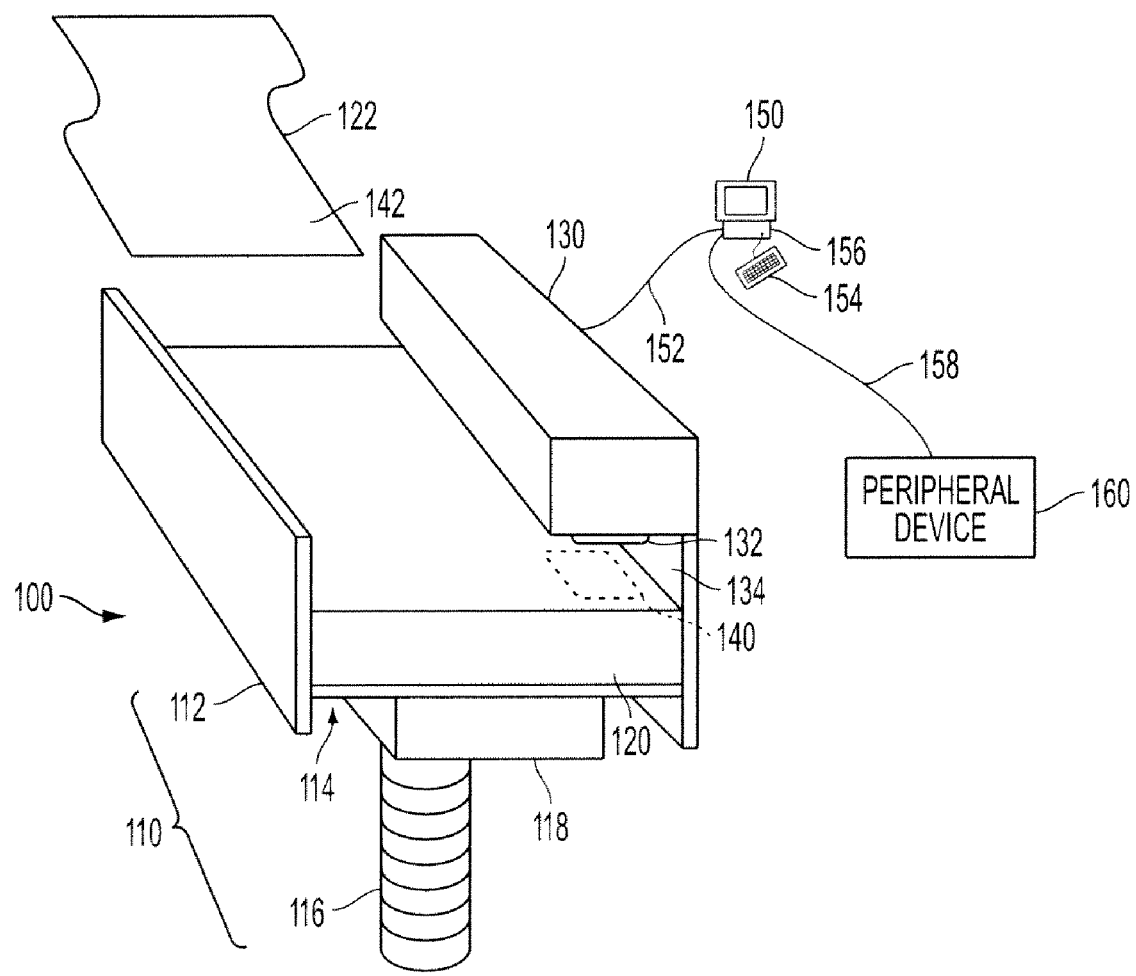
FIG. 1 is illustrates the paper, the paper accumulation unit, the spectrophotometer, and the integration with a computer and peripheral devices.

With reference to FIG. 1, one embodiment of the present application discloses a systems, method and apparatus 100 which reads a substantially invisible mark 140 from each of a plurality of stacked papers 120 as the papers are fed individually 122 and stacked 120 in a paper accumulation unit 110.

Individual sheets of paper or printed material 122, each with a substantially invisible mark 140, 142, are fed individually into a paper accumulation unit 110. The paper accumulation unit 110 is comprised of sides 112 that align and hold a stack of previously individually fed sheets of stacked paper 120, a bottom tray 114 that moves down as the papers are added, wherein the movement is resisted by a spring 116 attached to the tray 114 by an attaching means 118. The paper accumulation unit is attached to a spectrophotometer 130, which contains at least one lens 132, which emits light or ultraviolet light beams or other information transmitting medium 134 in the direction of the stacked paper 120. Each sheet of paper contains a mark 140 which is comprised of a writing, picture, or symbol printed in an ink or other printing means that is not visible to the human eye, but is detectable and readable by a device such as, but not limited to, a spectrophotometer 130. The spectrophotometer 130 is attached to a computer or other computing means 150 by wire, cable, wireless means, or other communication transmittal medium 152, through which a signal is transmitted conveying some aspect of the paper stacked in the accumulator 110. The computer will have received instructions through a computer data input device 154 such as, but not limited to a keyboard, floppy disc, CD readable media, Internet connection, network connection, and the like. These instructions are stored in a computer operable memory 156. The instructions to be performed when a condition has been reached or achieved by the collective stack of paper 120. Such a condition may include, but is not limited to, total count of a given number of pages, completion of a set or unit or bundle of papers, receiving of a particular sheet or collection of sheets, and the like. Once the condition is achieved, the computer 150 may then issue instructions across either the same 152 or a different transmittal medium 158 to a peripheral device 160, which may transport the collected stack of paper 120 to another stage in the graphic arts process such as, but not limited to, binding, bundling, folding, envelope stuffing, spindling and the like. Moving the collective stack of paper 120 will remove the stack of paper 120 from the paper accumulator 110, leaving the accumulator 110 empty. Once the weight of the stack of paper 120 is removed from the paper tray 114, this will remove tension from the spring 116, and cause the paper tray 114 to move upward and return to an initial empty position. Once reset, the device is prepared to receive another new sheet or sheets of paper and enable the accumulation process to repeat as necessary.

The process of placing the mark on the paper is substantially the reverse of the process involved in reading the mark. First data is input into a computer operable medium through use of an input device and stored in a database or computer operable memory. The computer then converts the data into a mark comprised of a symbol, alphanumeric characters, and the like. Then the mark is placed on the paper using a printing device such as, but not limited to, a printer, a laser printer, a dot matrix printer, and the like. The paper then contains the mark which is then able to be detected, read, and interpreted by a detection means such as the spectrophotometer.

Figure 2:
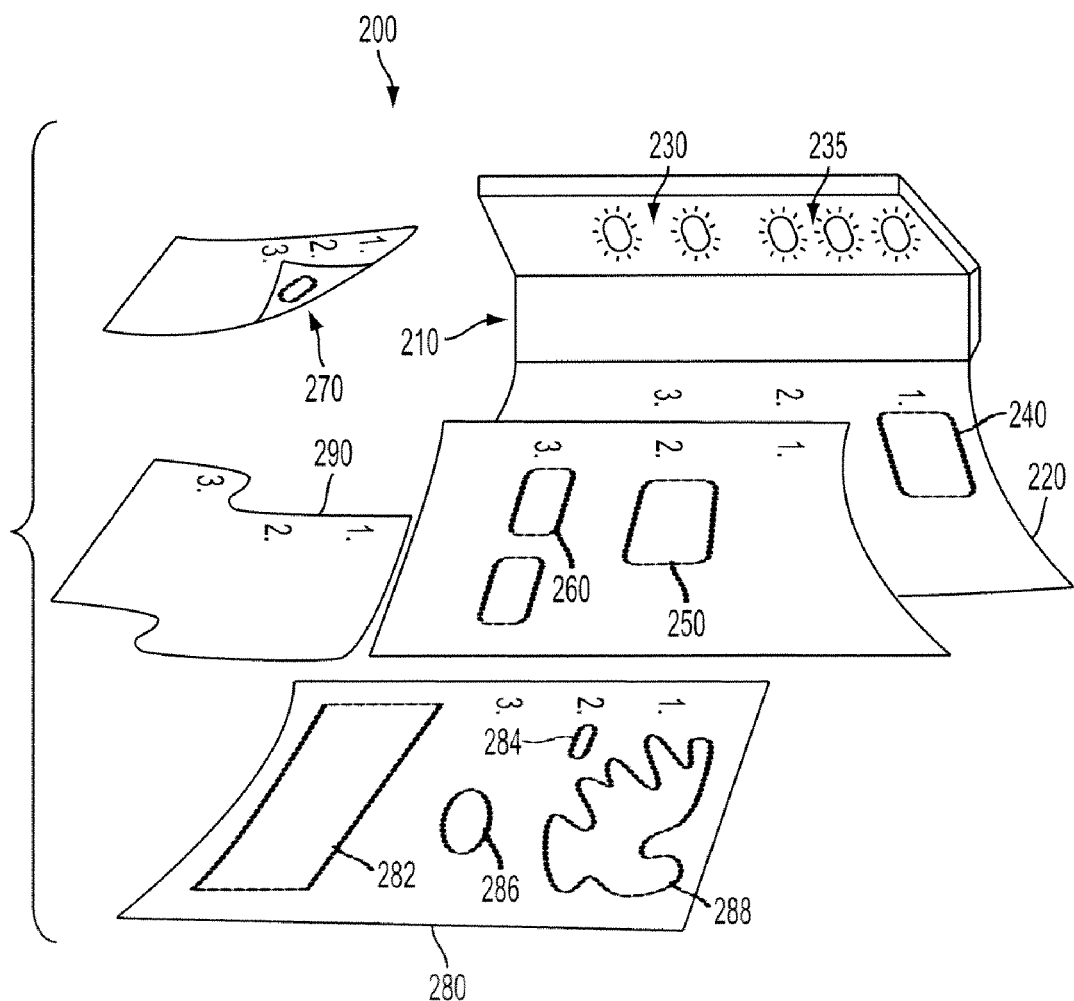
FIG. 2 is an illustration that the marks may be located anywhere on the page and that a page may have multiple marks or no marks at all.

With reference to FIG. 2 the present application presents another embodiment 200 which may incorporate multiple spectrophotometers 210 to read marks located on various parts of the page of paper 220. The spectrophotometers may be located a significant distance apart 230, or substantially close together 235. The marks may have only one substantially invisible mark located at one specific point in a page 240, and may have a mark located at a different position relative to the mark of an earlier page 250. A page may have a mark located on opposite column sides of the page, such as on the left or right side of the page 260, or even on opposite reverse sides of a page, such as the front and back of a sheet of paper 270. The spectrophotometers may read a mark on the opposite reverse side of the page by reading through the page, or an additional spectrophotometers lens might be located on the opposite reverse side of the page to read said mark. The marks may be of different sizes and shapes 280, such as a large mark covering a large portion of, or substantially all of the page 282, or a small mark covering a minute portion of the page 284, a geometric shape 286, or an obtuse shape 288. Some pages may have no mark at all 290, while some pages may have multiple marks 280.

More elaborate implementation would comprise of more than one spectrophotometric sensor measuring and decoding these invisible symbologies for executing multiple tasks such as to indicate additional collaterals to be inserted in the envelope such as for use in advertisements, flyers coming from additional feeders connected on the side, and the like.

Figure 3:
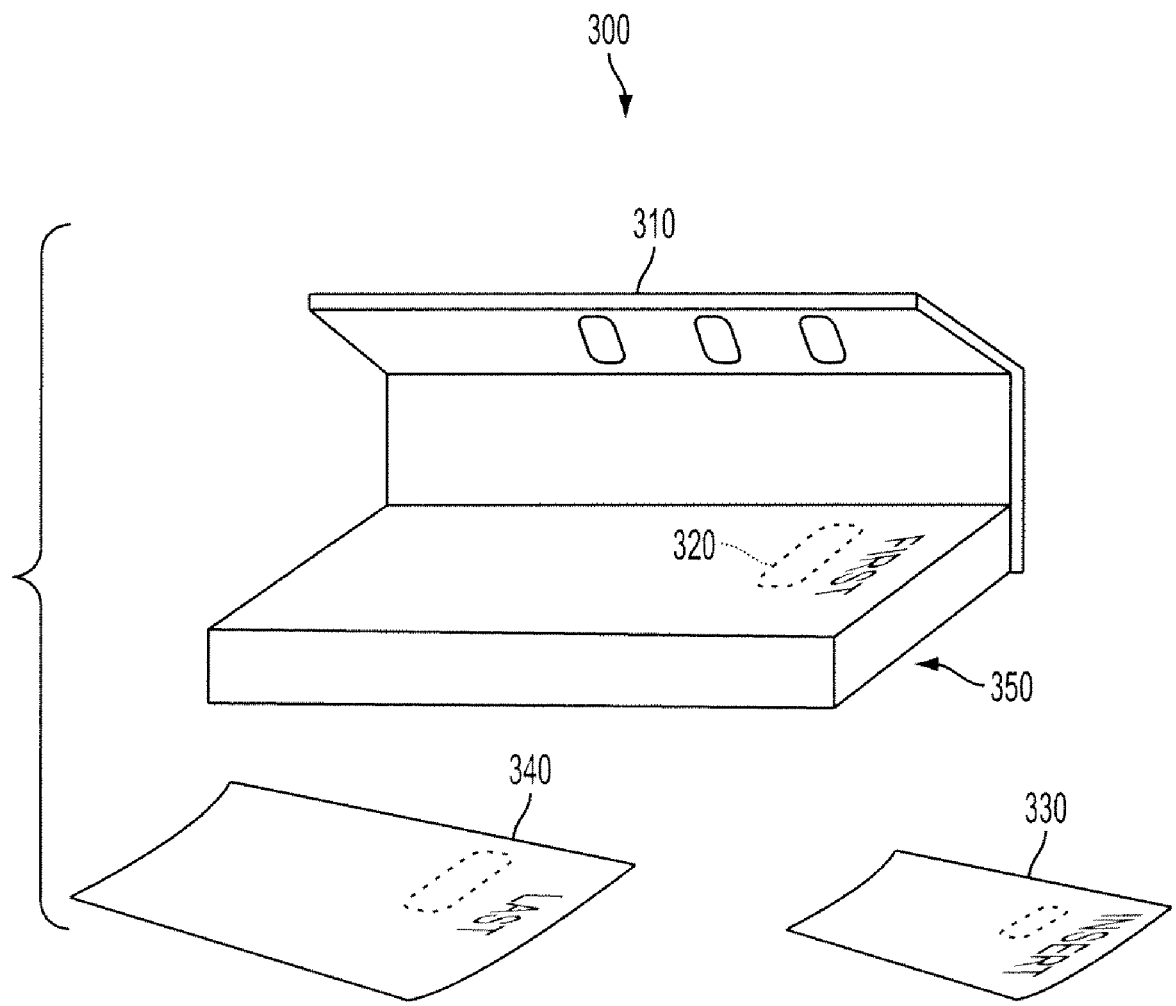
FIG. 3 is an illustration of how inserts may be placed between marked pages.

With reference to FIG. 3, the present application discloses another embodiment which uses a spectrophotometer to perform in substantially the same manner as in the previous aspect, but is able to insert a page or other media when prompted by the reading of a substantially invisible mark 300. Here, the inline spectrophotometer 310 is used in conjunction with the automated insertion equipment such as insertion equipment made by Pitney Bowes, Bell and Howell, Gunther and the like. These equipments depend on symbology in the first page 320 and a last page 340 of the job 350 to allow the insertion of an insert page 330 anywhere in between the first page 320 and last page 340.

Figure 4:
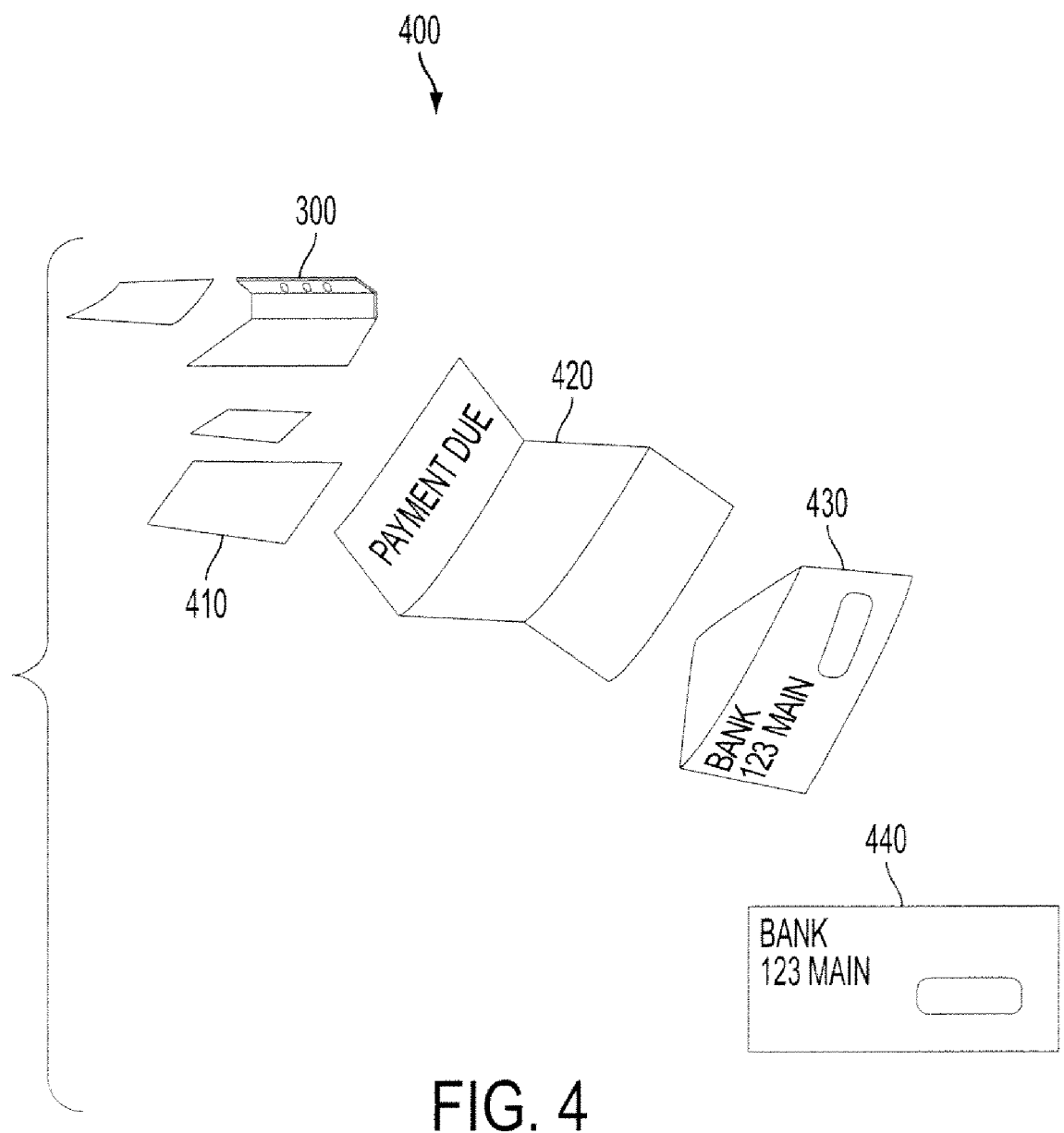
FIG. 4 is an illustration of how the forms may be folded and placed in envelopes.

With reference to FIG. 4, the present application discloses an embodiment that may be used to facilitate mailings 400. After the insertion process 300, the combined inserted material 410, or any material, may be folded 420 and the folded contents placed into envelopes 430 and placed in a medium ready to be mailed out 440. The mailing process may also occur without any preceding insertion process.

Figure 5:
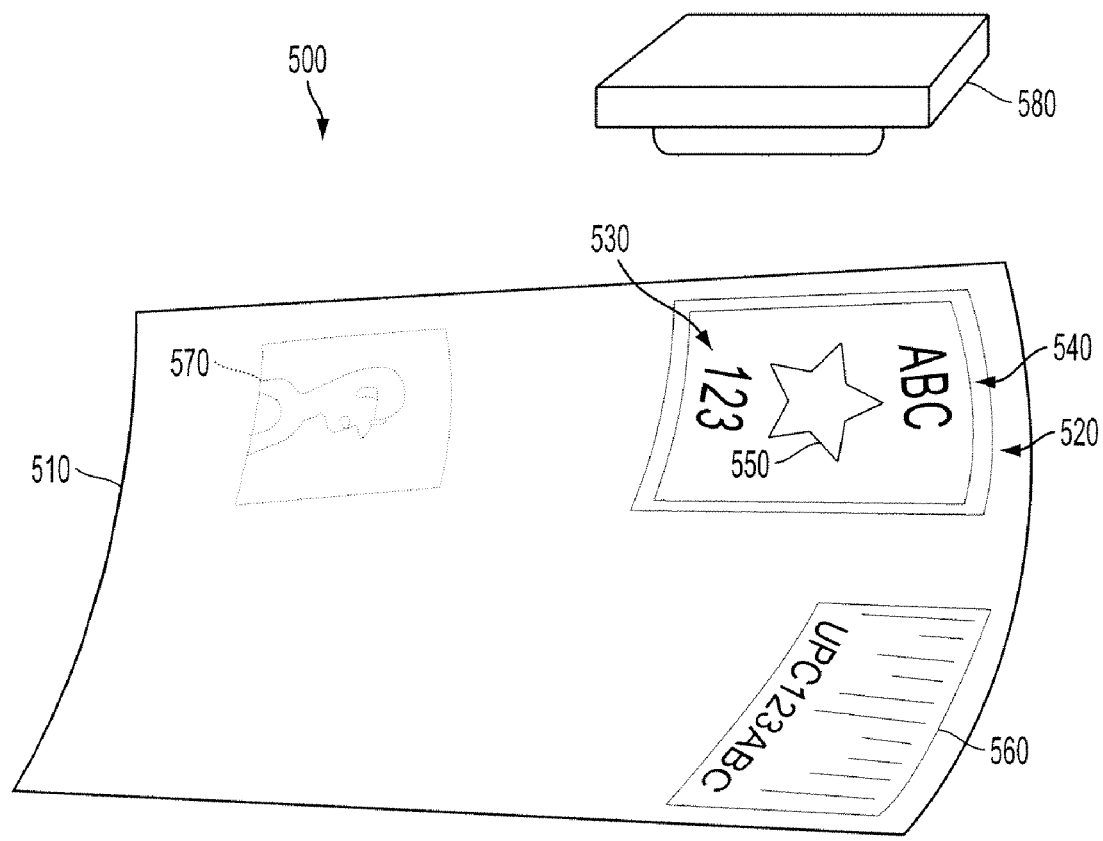

With reference to FIG. 5 the present application discloses a plurality of types of marks 500 incorporated by the present application. The paper 510 may be printed with a special symbology 520 composed of a yellow low area coverage marks or with clear toner. Such a mark may be composed of a number 530, lettering 540, a symbol 550 such as, but not limited to a geographical shape, a logo, a trademark, a drawing, or a universal product code (UPC) 560, a photograph 570, or any other type of mark comprised of any conceivable symbol or writing that might convey a meaning to a person or device that was made aware of such an mark, or any such combination of these elements. The ink or toner used to affix the mark will be so faint that the mark and the communication contained therein will be essentially invisible as not visible to the unaided human eye. A viewer or reader 580 will be necessary to read and interpret such a mark. The viewer or reader will be necessary to find and expose the existence of the mark. Once the mark is exposed and viewable, a device such as, but not limited to, a computer may be necessary in order to interpret and derive meaning from the uncovered mark. This will be a necessary condition for operation if the mark is a symbol not readily interpretable to an unaided person, such as a UPC code.

The present application may provide an extension to a sensing mechanism for a finishing control management system. A simple implementation would consist of a single spectrophotometric sensor 530 mounted on the paper accumulator, which is a modified version of a stacker specifically designed for accumulating sheets 100. The sheet with the invisible mark on it would indicate the end of the document allowing the stack of sheets of documents to be moved to the next stage, generally for automatically stuffing, inserting etc. which will indicate the beginning of the insertion.

A spectrophotometer, such as the inline spectrophotometer developed by XEROX, possesses a sensitivity which makes this device ideal for measuring low area coverage yellow marks or marks with clear toner. The measurement technique has been demonstrated successfully in the laboratory equipment.

Figure 6:
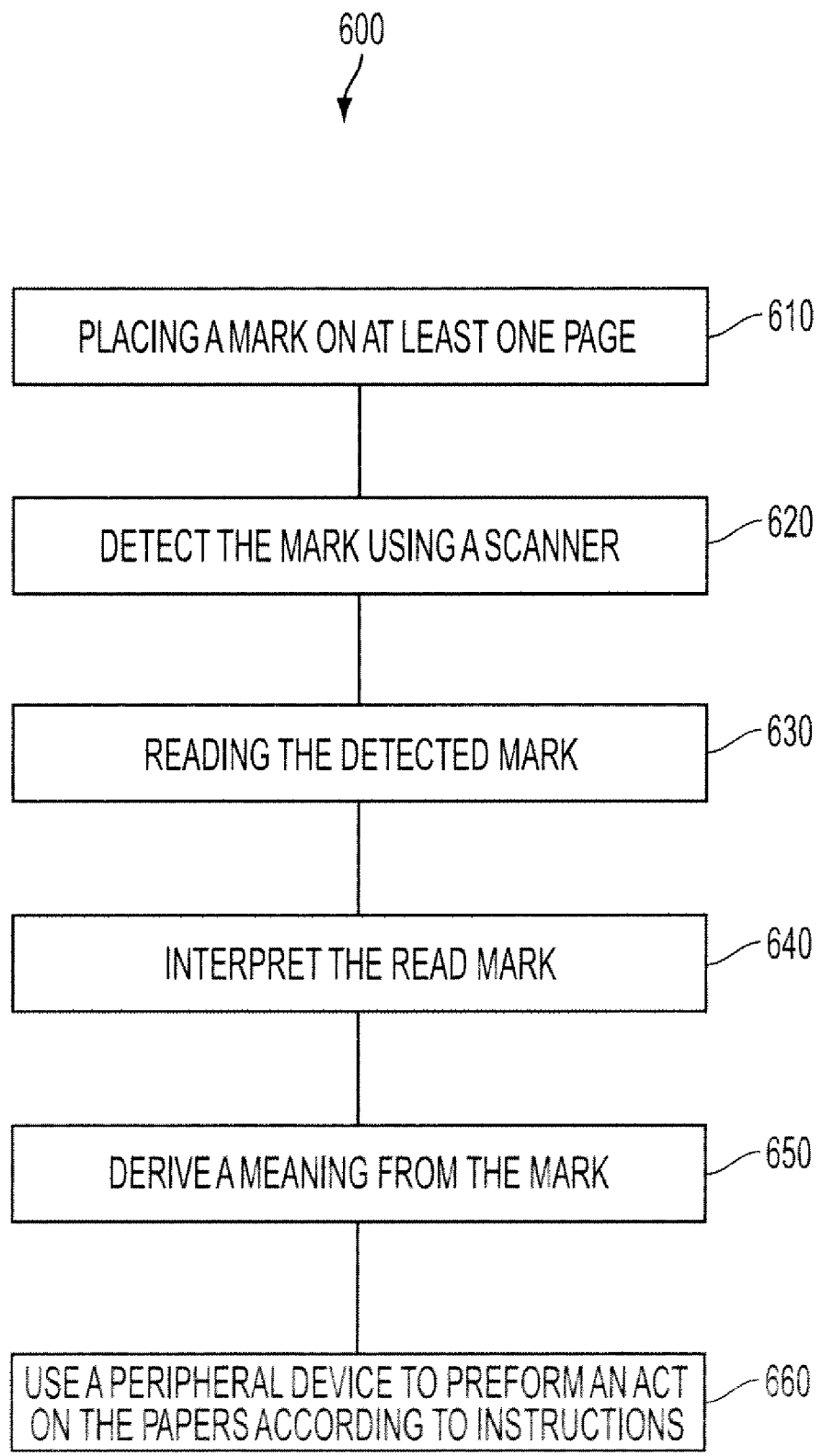
FIG. 6 is a flow chart illustrating the method claim.

With reference to FIG. 6, a method of using the disclosure of the present application is presented 600. This method comprises of first placing the non-visible marks on at least one page 610, detecting the mark using a detection apparatus 620, reading the detected mark 630; interpreting the read It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An apparatus for affixing and using non-visible printed marks with clear toner, the apparatus comprising:
   a paper accumulator adapted to receive at least one associated sheet of printed paper and hold the at least one associated sheet in a stack;
   an inline spectrophotometer attached to the paper accumulator and being adapted for detecting and then reading the mark with clear toner when the at least one associated sheet is contained in the paper accumulator, the inline spectrophotometer detecting a presence of the mark with clear toner on the at least one associated sheet in the stack indicating that a condition is met for prompting movement of the stack to a peripheral device for completing a finishing operation;
   a computer operable database containing information related to an instruction to be performed on the stack when a condition is met;
   a means for comparing the inline spectrally sensed mark that is received from the inline spectrophotometer with the information in the computer operable database, the means being further adapted to send the instruction to a peripheral device when the condition is determined as being met; and
   a peripheral device inline with the system, the peripheral device adapted for performing the instruction contained in the computer operable database.

2. The apparatus of claim 1, wherein the spectrophotometer further comprises multiple spectrophotometers adapted to read clear toner.

3. The apparatus of claim 1, wherein the peripheral device combines pages from a plurality of sources.

4. The apparatus of claim 1, wherein the peripheral device inserts an insert into a plurality of pages.

5. The apparatus of claim 1, wherein the peripheral device folds a paper and places the folded paper into an envelope.

6. A method of using non-visible marks, the method comprising:
- providing at least one associated page including a mark applied with a clear toner and being not readily visible to an unaided human eye;
- storing instructions in a database;
- holding the at least one associated page in a paper accumulator;
- detecting the mark while the at least one associated page is contained in the paper accumulator, the detecting using an inline spectrophotometer attached to the paper accumulator;
- reading the detected mark when the at least one associated page is contained in the paper accumulator;
- sending a signal to a computing device in communication with the inline spectrophotometer for conveying an aspect of the at least one associated page stacked in the page accumulator;
- interpreting the spectrally sensed mark including determining whether the aspect is indicative of a condition;
- sending instructions to an inline peripheral device in response to the condition being met for completing a finishing operation on the at least one associated page; and,
- feeding the at least one page to the inline peripheral device based on the interpreting.

7. The method of claim 6 further comprising applying the I mark on the at least one page using a printer inline with the spectrophotometer.

8. The method of claim 6 wherein the spectrophotometer further includes multiple spectrophotometers.

9. The method of claim 6 wherein the reading comprises converting the spectrally sensed mark to a computer readable format.

10. The method of claim 6 wherein the interpreting includes:
- comparing the spectrally sensed mark in a computer readable format with information substantially related to the mark contained in a computer operable database;
- selecting information that closest matches the spectrally sensed mark; and,
- outputting the selected information.

11. The method of claim 6 wherein the outputted selected information is used to prompt a peripheral device to perform an additional function with the at least one page.

12. A system for using non-visible printed marks comprising:
- means for printing a non-visible mark onto at least one associated page using clear toner, the non-visible mark conveying an aspect of the at least one associated page;
- at least one stacking component for receiving and holding the at least one associated page in a stack;
- at least one inline spectrophotometer attached to the stacking component for indicating the presence or absence of the non-visible mark when the at least one associated page is contained in the stacking component;
- for the inline spectrophotometer converting the detected spectrally sensed mark into a computer operable format;
- at least one processing component for looking up the computer operable format conversion of the spectrally sensed mark on a database and retrieving computer instructions, the processing component sending the instructions to a peripheral device when the aspect indicates a condition being met; and
- a peripheral device working inline with the system, the peripheral device completing a finishing operation on the at least one associated page when the spectrophotometer reads the clear toner mark.

13. The system of claim 12, wherein the spectrophotometer further includes multiple of spectrophotometers.

14. The system of claim 12, wherein the inline peripheral device combines pages from a plurality of sources.

15. The system of claim 12, wherein the peripheral device is the automated insertion equipment.

16. The apparatus of claim 12, wherein the inline peripheral device folds the paper and places the folded paper into an envelope.

* * * * *